(12) United States Patent
Mizusawa

(10) Patent No.: US 10,377,433 B2
(45) Date of Patent: Aug. 13, 2019

(54) ELASTIC CRAWLER AND ELASTIC CRAWLER DRIVE MECHANISM

(71) Applicant: BRIDGESTONE CORPORATION, Tokyo (JP)

(72) Inventor: Takashi Mizusawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 114 days.

(21) Appl. No.: 15/542,595

(22) PCT Filed: Feb. 12, 2016

(86) PCT No.: PCT/JP2016/000747
§ 371 (c)(1),
(2) Date: Jul. 10, 2017

(87) PCT Pub. No.: WO2016/129292
PCT Pub. Date: Aug. 18, 2016

(65) Prior Publication Data
US 2018/0265144 A1    Sep. 20, 2018

(30) Foreign Application Priority Data

Feb. 13, 2015 (JP) .................................. 2015-026511

(51) Int. Cl.
*B62D 55/12* (2006.01)
*B62D 55/253* (2006.01)
*B62D 55/24* (2006.01)

(52) U.S. Cl.
CPC ........... *B62D 55/12* (2013.01); *B62D 55/244* (2013.01); *B62D 55/253* (2013.01)

(58) Field of Classification Search
CPC .............................. B62D 55/12; B62D 55/253
(Continued)

(56) References Cited

U.S. PATENT DOCUMENTS 6,698,850 B2 * 3/2004 Ueno ................. B62D 55/0885
305/115
6,848,757 B2 * 2/2005 Ueno ................. B62D 55/0885
305/115

(Continued)

FOREIGN PATENT DOCUMENTS

CN        102712343 A     10/2012
EP        2 554 457 A1     2/2013
(Continued)

OTHER PUBLICATIONS

International Search Report of PCT/JP2016/000747 dated Apr. 26, 2016 [PCT/ISA/210].

(Continued)

*Primary Examiner* — S. Joseph Morano
*Assistant Examiner* — Jean W Charleston
(74) *Attorney, Agent, or Firm* — Sughrue Mion, PLLC

(57) ABSTRACT

In an elastic crawler (10) and an elastic crawler drive mechanism (100), at least a portion of the outer edge of an engaging portion (12) has a cross-sectional arc shape such that both the trajectory drawn by the outer edge of the engaging portion (12) from when the engaging portion (12) starts to enter a tooth groove of a sprocket (20) until engagement between the engaging portion (12) and teeth (22) is complete and the trajectory drawn by the outer edge of the engaging portion (12) from when the engaging portion (12) starts to disengage from the teeth (22) until disengagement is complete do not project further outward than the outer edge of the engaging portion (12) when the engagement is complete.

12 Claims, 8 Drawing Sheets

(58) Field of Classification Search
USPC ........ 305/199, 193, 194, 195, 197, 198, 200
See application file for complete search history.

(56) References Cited

U.S. PATENT DOCUMENTS

| | | | | |
|---|---|---|---|---|
| 6,883,876 B2* | 4/2005 | Yamamoto | ........... | B62D 55/088 |
| | | | | 305/115 |
| 7,159,956 B1* | 1/2007 | Hatchell | ............ | G11B 33/0455 |
| | | | | 206/308.1 |
| 7,896,449 B2* | 3/2011 | Matsuo | ................ | B62D 55/244 |
| | | | | 305/115 |
| 2009/0085399 A1* | 4/2009 | Moyna | ................... | B62D 55/12 |
| | | | | 305/199 |

FOREIGN PATENT DOCUMENTS

| | | |
|---|---|---|
| JP | 51-045836 A | 4/1976 |
| JP | 2010-047173 A | 3/2010 |
| JP | 2014-162311 A | 9/2014 |

OTHER PUBLICATIONS

Written Opinion of PCT/JP2016/000747 dated Apr. 26, 2016 [PCT/ISA/237].

Communication dated Nov. 28, 2018, from the State Intellectual Property Office of People's Republic of China in counterpart Application No. 201680009534.8.

* cited by examiner

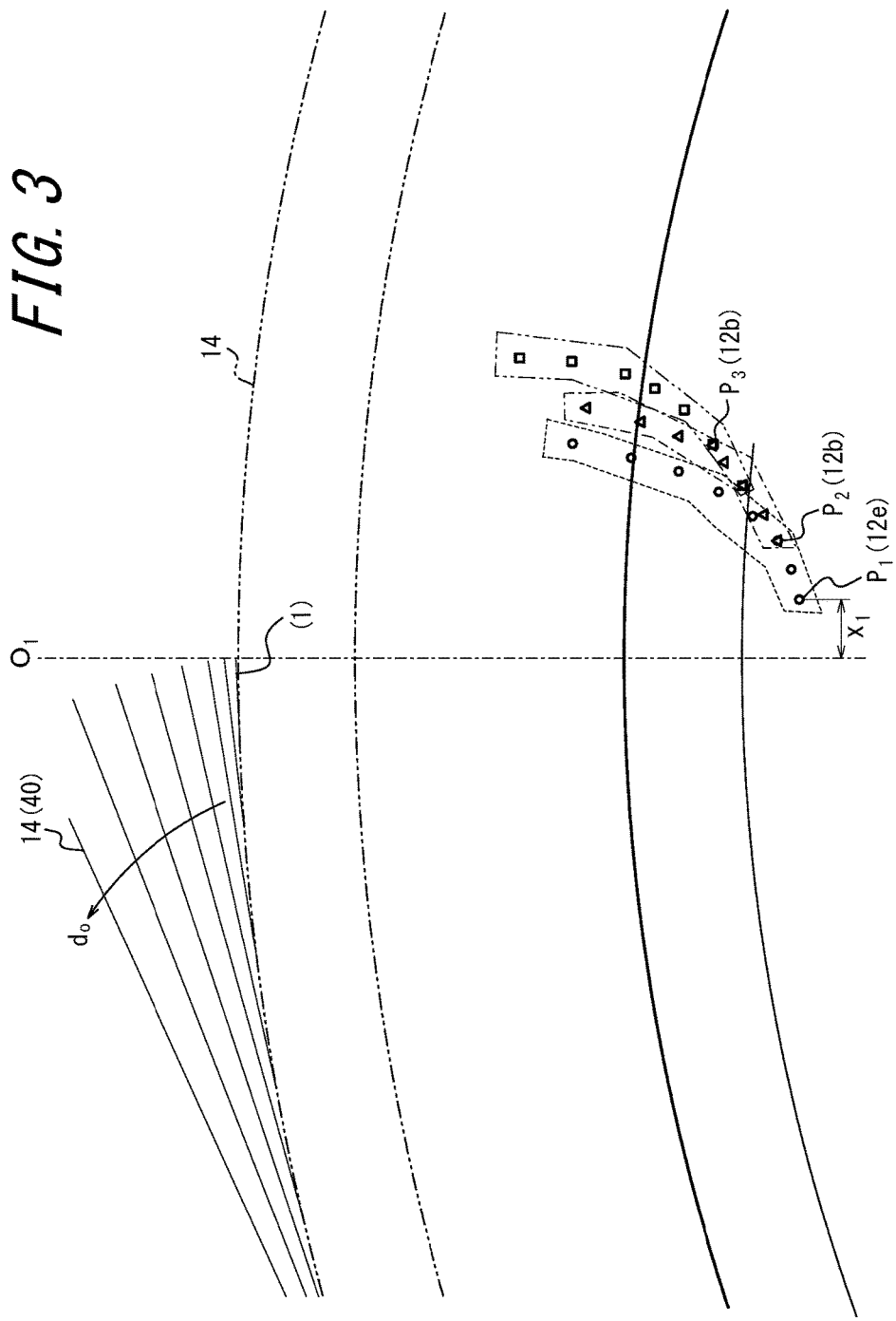

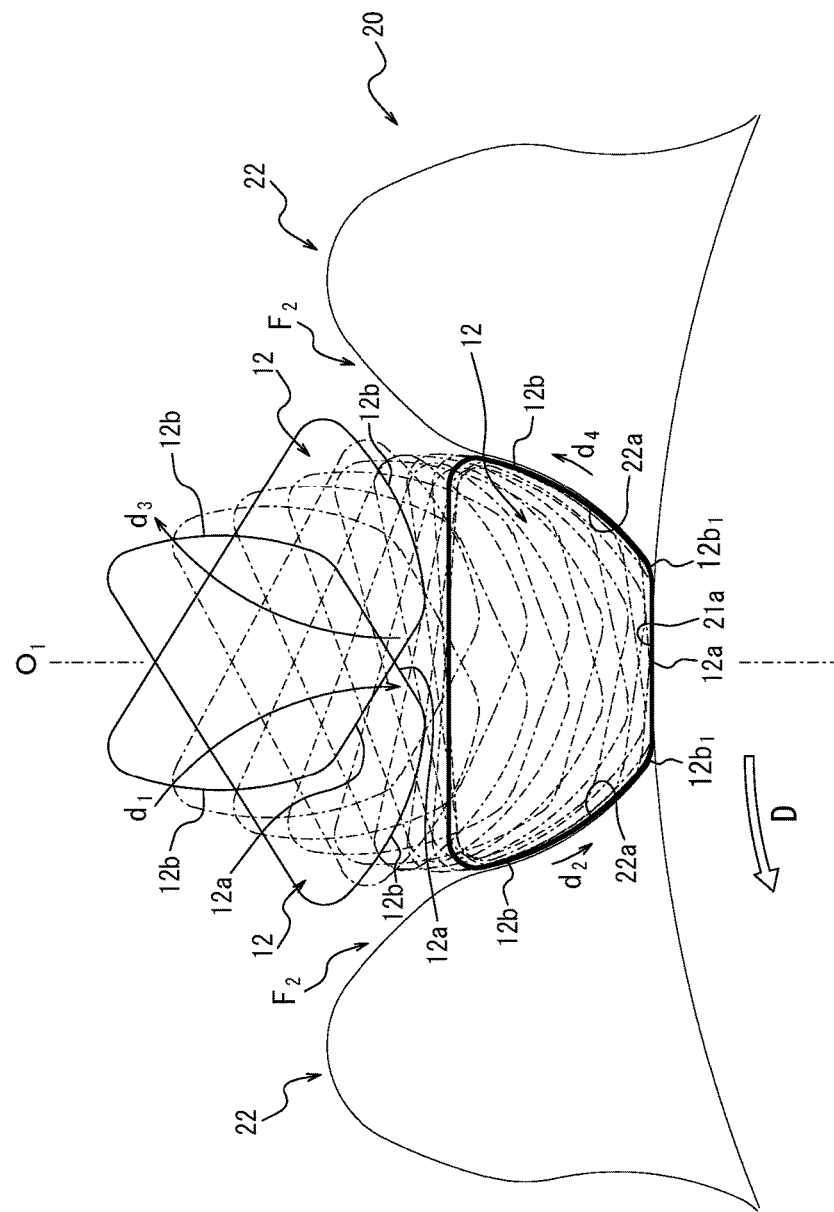

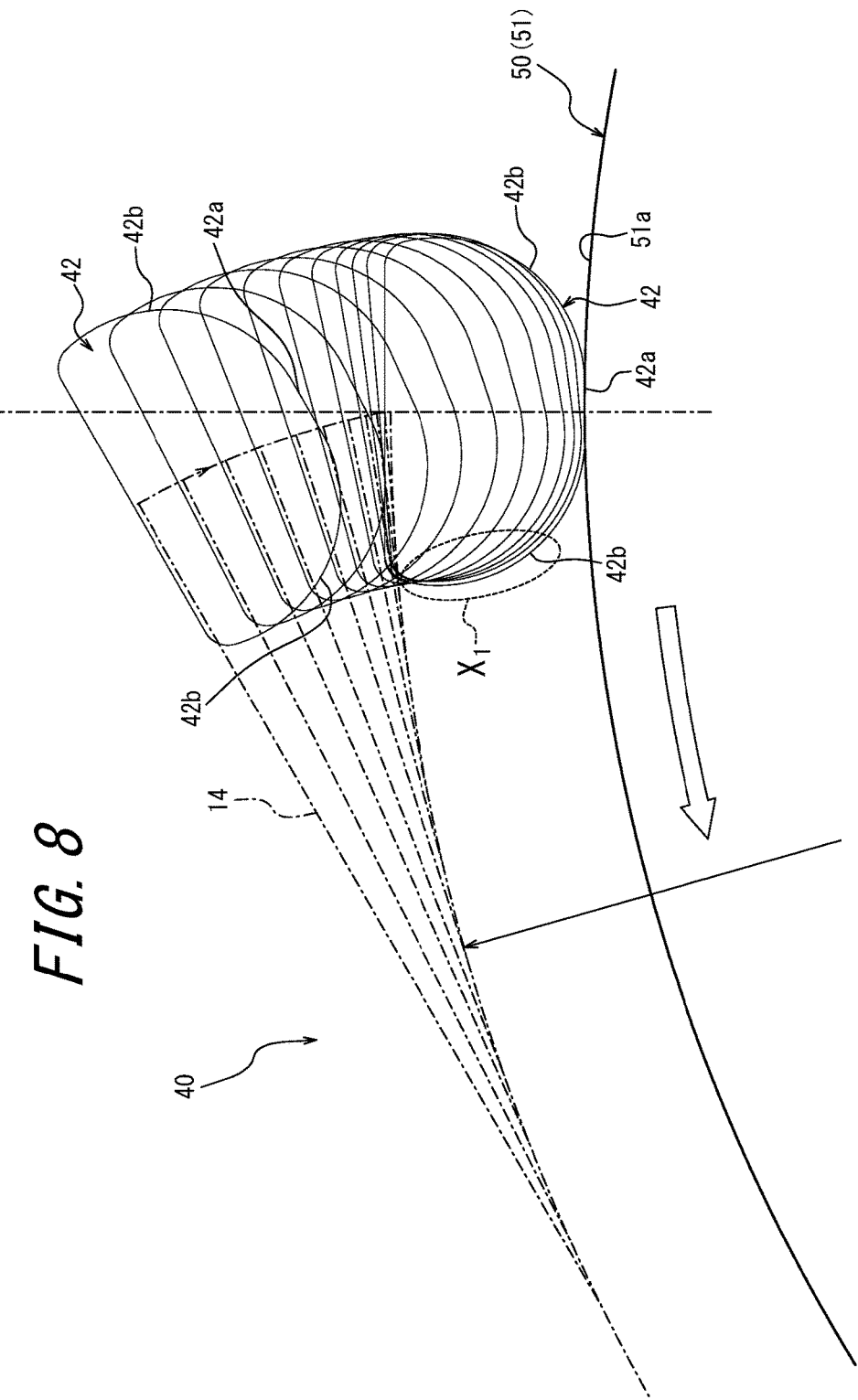

ELASTIC CRAWLER AND ELASTIC CRAWLER DRIVE MECHANISM

CROSS REFERENCE TO RELATED APPLICATIONS

This application is a National Stage of International Application No. PCT/JP2016/000747, filed Feb. 12, 2016, claiming priority based on Japanese Patent Application No. 2015-026511, filed Feb. 13, 2015, the contents of all of which are incorporated herein by reference in their entirety.

TECHNICAL FIELD

This disclosure relates to an elastic crawler and an elastic crawler drive mechanism.

BACKGROUND

A drive mechanism for driving an elastic crawler by engaging teeth of a sprocket with the core bars of the elastic crawler is known (for example, see JP 2010-47173 A (PTL 1)).

CITATION LIST

Patent Literature

PTL 1: JP 2010-47173 A

SUMMARY

Technical Problem

With a conventional mechanism, however, the core bar slips at the base of the sprocket teeth just before the sprocket completely engages with the core bar or just after the start of disengagement, causing the core bar and the tooth base of the sprocket to contact and rub against each other, which may lead to wear at the engaging surface of the core bar and the tooth base of the sprocket. Such rubbing is caused by a phenomenon called undercutting, whereby the trajectory drawn by the outer edge of the core bar before and after engagement between the core bar and the sprocket teeth deviates from the outer edge of the completely engaged core bar.

Forming a clearance between the engaging surface of the core bar and the base of the sprocket teeth to address this issue increases the stress on the engaging surface of the core bar and on the tooth surface outside of the tooth base of the sprocket. This increase in stress leads to the problem of an increased load on the core bar and the sprocket teeth.

Therefore, it would be helpful to provide an elastic crawler and an elastic crawler drive mechanism that improve the durability of the elastic crawler and the sprocket.

Solution to Problem

An elastic crawler according to this disclosure includes a plurality of engaging portions on an elastic endless belt, the engaging portions being capable of engaging with teeth of a sprocket, wherein at least a portion of an outer edge of each engaging portion has a cross-sectional arc shape such that both a trajectory drawn by the outer edge of the engaging portion from when the engaging portion starts to enter a tooth groove of the sprocket until engagement between the engaging portion and the teeth is complete and a trajectory drawn by the outer edge of the engaging portion from when the engaging portion starts to disengage from the teeth until disengagement is complete do not project further outward than the outer edge of the engaging The elastic crawler according to this disclosure can improve the durability of the elastic crawler and the sprocket.

In the elastic crawler according to this disclosure, the cross-sectional arc shape may have at least one center point positioned at a distance of PCD×m on the sprocket side of a bending center line when the elastic crawler is wrapped around the sprocket, where 0.25%≤m≤3%, and PCD is a pitch circle diameter of the elastic crawler when the elastic crawler is wrapped around the sprocket.

The point approximating the center point of the cross-sectional arc shape can be calculated easily in this case, facilitating manufacturing of the elastic crawler.

In the elastic crawler according to this disclosure, points approaching the at least one center point may include two points positioned a distance of PCD×n apart in a circumferential direction of the endless belt, where 2.5%≤n≤5%.

An arc shape suitable for forward and reverse can easily be prescribed in this case, facilitating manufacturing of the elastic crawler.

An elastic crawler drive mechanism according to this disclosure includes one of the aforementioned the elastic crawlers and the sprocket.

The elastic crawler drive mechanism according to this disclosure can improve the durability of the elastic crawler and the sprocket.

In the elastic crawler drive mechanism according to this disclosure, the outer edge of the teeth may have a shape corresponding to the outer edge of the engaging portions.

The durability of the elastic crawler and the sprocket is further improved in this case.

Advantageous Effect

According to this disclosure, an elastic crawler and an elastic crawler drive mechanism that improve the durability of the elastic crawler and the sprocket can be provided.

BRIEF DESCRIPTION OF THE DRAWINGS

In the accompanying drawings:

FIG. 3 is a schematic analysis diagram illustrating a method for constructing a boundary shape that prevents undercutting by the outer edge of the engaging surface of the core bar in the elastic crawler;

FIG. 4 is a schematic analysis diagram illustrating the trajectory drawn during wrapping around by the outer edge of the engaging surface of a core bar formed using the construction method illustrated in FIG. 3;

FIG. 8 is a schematic analysis diagram illustrating the trajectory drawn by the core bar before and after the sprocket teeth and the core bar engage when an elastic crawler having core bars with a cross-sectional arc shape is wrapped around the sprocket.

DETAILED DESCRIPTION

With reference to the drawings, the following describes an elastic crawler and an elastic crawler drive mechanism according to embodiments of this disclosure. As referred to below, the width direction of the elastic crawler is the same as the width direction of an endless belt, and the circumferential direction of the elastic crawler is the same as the circumferential direction of an endless belt.

Figure 1A:
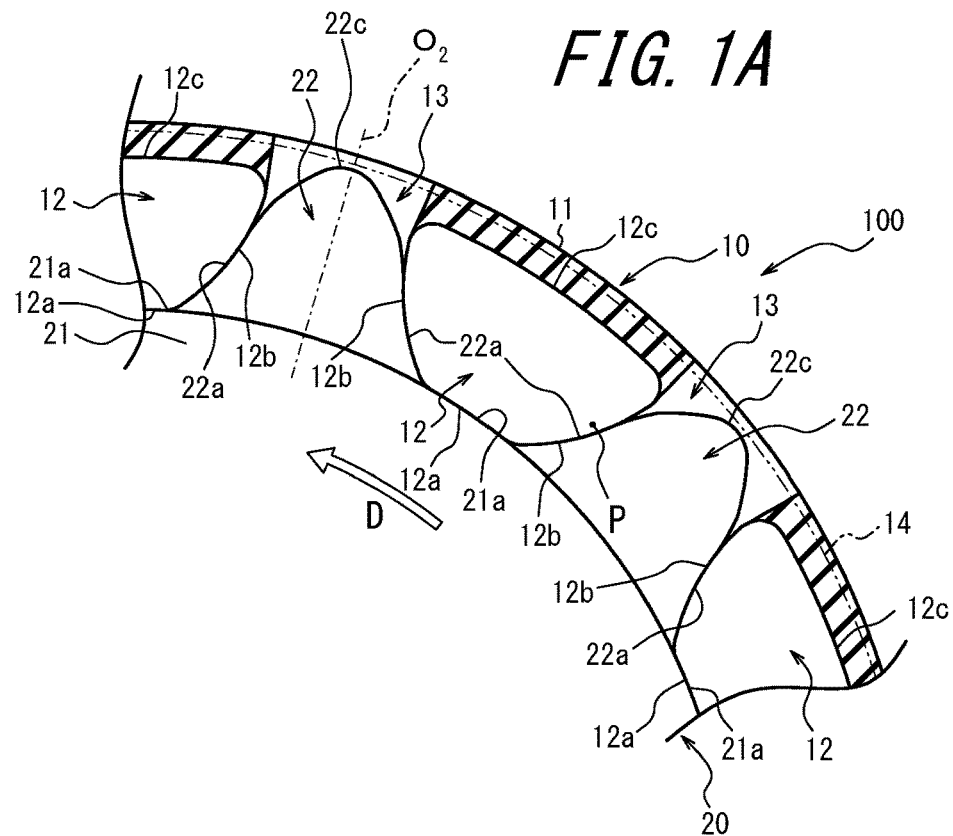
FIG. 1A is a side view schematically illustrating a cross-section of an elastic crawler in an elastic crawler drive mechanism according to one of the disclosed embodiments.

FIG. 1A illustrates an elastic crawler 10, with core bars, according to one of the disclosed embodiments. A plurality of core bars (engaging portions) 12 are disposed along an elastic endless belt 11 in the elastic crawler 10. The endless belt 11 is an annular member with no end. The endless belt 11 of this embodiment is, for example, formed by vulcanizing a rubber material. The core bars 12 are disposed at intervals in the circumferential direction on the inner circumferential side of the endless belt 11. In this embodiment, a plurality of housings 13 are formed on the endless belt 11 at intervals in the circumferential direction. The housings 13 may formed as through-holes, as illustrated in FIG. 1A, or as recesses. A main cord layer 14 is disposed inside the endless belt 11 in the elastic crawler 10 according to this embodiment. The main cord layer 14 for example includes a plurality of steel cords, at intervals in the width direction, that wrap around the endless belt 11. In the elastic crawler 10, a plurality of lugs are provided on the outer circumferential surface of the endless belt 11 at intervals in the circumferential direction, but these lugs are omitted in this embodiment.

Figure 2A:
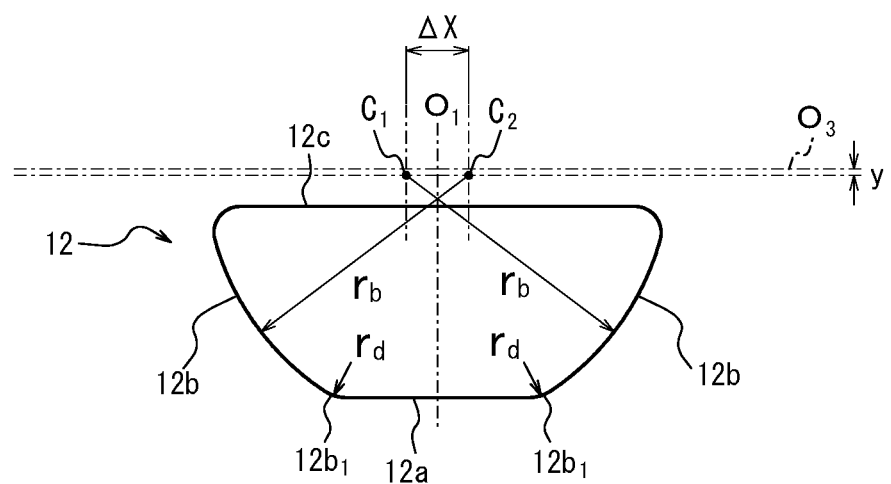
FIG. 2A is a side view schematically illustrating a core bar according to one of the disclosed embodiments.

As illustrated in FIG. 2A, each core bar 12 of the elastic crawler 10 includes an edge surface 12a, engaging surfaces 12b, and a bottom surface 12c. Each core bar 12 extends in the width direction of the elastic crawler 10 (perpendicular to the drawing). The core bar 12 is composed of a metal material, such as iron, formed by casting or forging and is fixed in place to the inner circumference of the endless belt 11 by vulcanizing adhesion or the like. In this embodiment, as illustrated in FIG. 2A, the core bar 12 is formed so that the cross-sectional outline as viewed from the side is symmetrical about the central axis $O_1$ of the core bar 12 (the line dividing the edge surface 12a of the core bar 12 in two equal parts in the circumferential direction (forward and backward direction) of the elastic crawler 10). Also, as illustrated in FIG. 1A, the bottom surface 12c of the core bar 12 is buried on the outer circumferential side of the endless belt 11, and the edge surface 12a is disposed on the inner circumferential side of the endless belt 11.

As illustrated in FIG. 2A, in this embodiment, the cross-sectional outline of the core bar 12 as viewed from the side is tapered from the bottom surface 12c towards the edge surface 12a. As also illustrated in FIG. 2A, the cross-sectional outline of the engaging surfaces 12b as viewed from the side is an arc-shaped curved surface protruding outward from the core bar 12 (in this embodiment, away from the central axis $O_1$ of the core bar 12). This curved surface extends in the width direction of the elastic crawler 10. In this embodiment, the two engaging surfaces 12b are each formed as a curved surface with a radius of curvature $r_b$. Furthermore, in this embodiment, the edge surface 12a is a flat surface orthogonal to the central axis $O_1$ of the core bar 12.

Figure 1B:
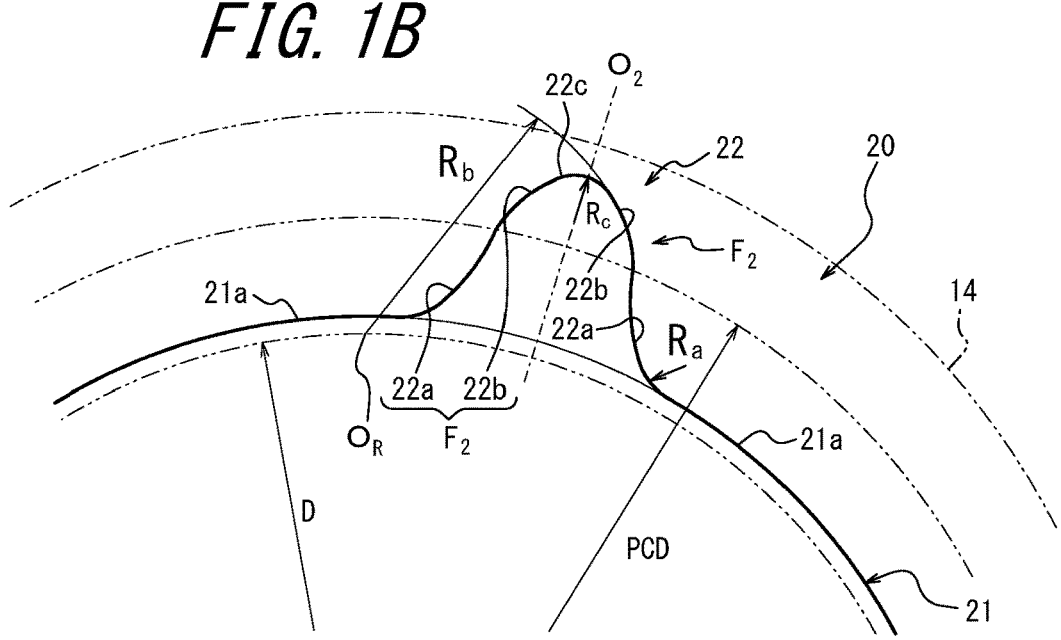
FIG. 1B is a side view schematically illustrating an enlargement of one tooth in the sprocket in FIG. 1A.

In FIGS. 1A and 1B, the core bars 12 of the elastic crawler 10 engage with a sprocket 20. The sprocket 20 includes a disk 21 as a rotating member and a plurality of teeth 22 arranged at intervals in the circumferential direction of the disk 21 (only one tooth 22 being illustrated in FIG. 1B). In this embodiment, the outer circumferential surface 21a of the disk 21 forms the tooth bottom surface (tooth bottom surface 21a).

As also illustrated in FIG. 1B, a cross-sectional outline of the tooth 22 in this embodiment when viewing the sprocket 20 from the side has a symmetrical shape about a line (central axis) $O_2$ extending radially from the center of the disk 21. The tooth 22 includes two tooth faces $F_2$, with the central axis $O_2$ therebetween, that are tapered from the tooth bottom surface 21a towards a tooth tip surface 22c. These two tooth faces $F_2$ are connected to each other by the tooth tip surface 22c.

In this embodiment, the two tooth faces $F_2$ each have a tooth base surface 22a connecting to the tooth bottom surface 21a. As illustrated in FIG. 1A, the tooth base surfaces 22a are formed to correspond to the engaging surfaces 12b of the core bars 12. In this embodiment, the outline of each tooth base surface 22a as viewed from the side is a recessed surface curved from the tooth bottom surface 21a inward towards the tooth 22 (in this embodiment, towards the central axis $O_2$ of the tooth 22). Each tooth base surface 22a in this embodiment is formed as a curved surface with a radius of curvature $R_a$. The radius of curvature $R_a$ is set so as to match the arc shape of the engaging surfaces 12b of the core bars 12. Consequently, the engaging surfaces 12b of the core bars 12 come into contact with the tooth base surfaces 22a of the teeth 22 with nearly no gap therebetween upon complete engagement with the teeth 22 of the sprocket 20. This allows engagement between the core bars 12 and the teeth 22 of the sprocket 20 over a large contact area.

As illustrated in FIG. 1A, the two tooth faces $F_2$ in this embodiment each have a tooth end surface 22b connecting to the tooth base surface 22a. The tooth end surface 22b is a backup engaging tooth face that typically does not engage with the core bars 12. As illustrated in FIG. 1B, each tooth end surface 22b is a curved surface protruding from the tooth base surface 22a outward from the tooth 22 (in this embodiment, away from the central axis $O_2$ of the tooth 22). In this embodiment, each tooth end surface 22b is formed as a curved surface with a radius of curvature $R_b$. The radius of curvature $R_b$ may be within a range of 40 mm to 150 mm (40 mm≤$R_b$≤150 mm). An example of a specific radius of curvature $R_b$ is 45.86 mm.

In further detail, the tooth end surface 22b may be prescribed by Equations (1) and (2) below.

The center $O_R$ of the radius of curvature $R_b$ forming the shape of the tooth end surface 22b (tooth shape center $O_R$) lies along an imaginary circle of diameter D. The diameter D of this imaginary circle (imaginary circle diameter) may be prescribed by Equation (1) below.

$$D = a \times PCD \quad (1)$$

In Equation (1), a is an arbitrary first coefficient. PCD is the pitch circle diameter (pitch circle diameter PCD) in millimeters. In this embodiment, the pitch circle diameter PCD may be prescribed by the following equation.

$$PCD = \text{number of teeth} \times \text{core bar pitch}/P1 \quad (2)$$

Specific examples are as follows: number of teeth=90, circle pitch=8 mm, P1=π, and PCD=229.3 mm. In this case, letting a=0.82 yields a value of 188.26 mm for the imaginary circle diameter D from Equation (1).

Furthermore, the radius of curvature $R_b$ may be prescribed by Equation (3) below.

$$R_b = PCD \times b \quad (3)$$

In Equation (3), b is an arbitrary second coefficient.

In this case, since PCD=229.3 mm from Equation (2), letting b=0.2 yields a value of 45.86 mm for the radius of curvature $R_b$ from Equations (1) and (3).

As illustrated in FIG. 1B, the tooth shape of the tooth end surface 22b in this embodiment is an arc formed with a radius of curvature $R_b$ (45.86 mm) having the tooth shape center $O_R$ along the imaginary circle diameter D (188.26 mm).

In this embodiment, the tooth tip surface 22c is a curved surface protruding outward from the tooth 22. The tooth tip surface 22c in this embodiment is formed as a curved surface with a radius of curvature $R_c$ and connects the two tooth end surfaces 22b. The radius of curvature $R_c$ may be any value but is preferably within a range of 5 mm to 15 mm (5 mm≤$R_c$≤15 mm). An example of a specific radius of curvature $R_c$ is 10 mm.

Figure 7:
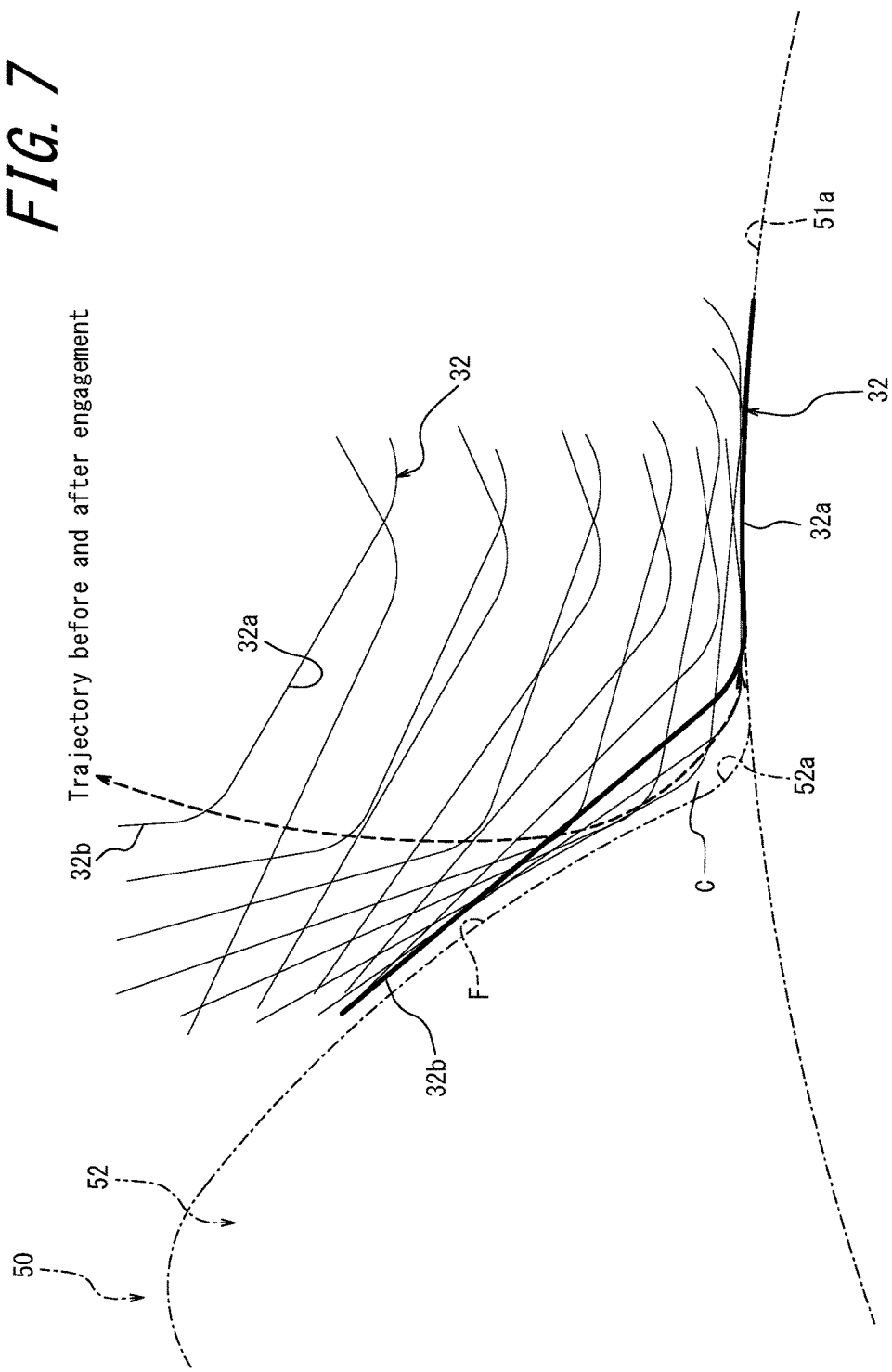
FIG. 7 is a schematic analysis diagram illustrating the state before and after the core bar of a conventional elastic crawler engages with the sprocket.

The mechanism by which undercutting occurs because of the trajectory drawn by the core bar is now described. FIG. 7 is a schematic analysis diagram illustrating the trajectory drawn by the outer edge of an engaging surface 32b of a core bar 32 when the elastic crawler is wrapped around. The core bar 32 has a trapezoidal cross-section as viewed from the side. In FIG. 7, the bold line indicates the outer edge of the core bar 32 when engagement between the core bar 32 and the teeth 52 of the sprocket 50 is complete, and the thin lines indicate the position of the outer edge of the core bar 32 sequentially before and after engagement. The dashed dotted line indicates the shape of the outer edge of the sprocket 50.

Engagement between the core bar 32 of the elastic crawler and the teeth 52 of the sprocket 50, indicated by the bold line in FIG. 7, proceeds as follows. When the elastic crawler starts to wrap around, the core bar 32 enters into the tooth groove formed between teeth 52 of the sprocket 50. The edge surfaces 32a of the core bar 32 then contact the tooth bottom surface 51a of the sprocket 50 perpendicularly and catch on the tooth faces F of the teeth 52 in the sprocket 50, completing the engagement. As illustrated by the thin lines in FIG. 7, undercutting occurs because either or both of the following two trajectories projects further outward than the outer edge of the engaging surface 32b of the core bar 32 when engagement is complete as indicated by the bold line: the trajectory drawn by the outer edge of the engaging surface 32b and 32a of the core bar 32 from when the core bar 32 starts to enter the tooth groove formed between the teeth 52 of the sprocket 50 until engagement between the core bar 32 and the tooth 52 is complete, and the trajectory drawn by the outer edge of the engaging surface 32b of the core bar 32 from when the core bar 32 starts to disengage from the tooth 52 until disengagement is complete. Since the occurrence of undercutting also depends on the shape of the core bar 32, undercutting may still occur even after changing the shape of the teeth 52 of the sprocket 50.

In order to resolve problems caused by undercutting, such as wear of the tooth base surface 52a of the tooth 52 in the sprocket 50, undercutting is prevented by recessing the tooth base surface 52a inward towards the tooth 52 to form a clearance (gap) C between the tooth 52 the engaging surface 32b of the core bar 32, as illustrated in FIG. 7. This approach, however, decreases the area of contact between the engaging surface 32b of the core bar 32 and the tooth face F of the tooth 52 in the sprocket 50. The stress applied to the engaging surface 32b of the core bar 32 and the tooth face F of the tooth 52 increases, increasing the load on the engaging surface 32b of the core bar 32 and the tooth 52 of the sprocket 50.

When forming the clearance C, the engaging surface of the core bar could be formed to have a cross-sectional arc shape as viewed from the side. FIG. 8 is a schematic analysis diagram illustrating the trajectory drawn by a core bar 42 at the time of engagement between the teeth of the sprocket 50 and the core bar 42 when an elastic crawler 40 having core bars 42 is wrapped around the sprocket 50 (FIG. 8 only shows a disk 51). Engaging surfaces 42b of the core bars 42 have a cross-sectional arc shape. The positions of the core bar 42 and the steel cord 14 are indicated sequentially for when the elastic crawler 40 is wrapped around the sprocket 50 from the left side to the right side of the figure by the sprocket 50 rotating in the direction of the outline arrow. In this case, even if the engaging surface 42b of the core bar 42 has a cross-sectional arc shape, undercutting occurs in the region $X_1$ if the trajectory drawn by the outer edge of the engaging surface 42b of the core bar 42 is shifted further outward in the circumferential direction in the region $X_1$ than the outer edge of the engaging surface 42b of the core bar 42 upon complete engagement. The engaging surface 42b of the core bar 42 and the tooth base of the teeth 52 in the sprocket 50 may therefore wear as a result of the engaging surface 42b of the core bar 42 slipping against the tooth base of the tooth 52 in the sprocket 50, even if the engaging surface 42b of the core bar 42 has a cross-sectional arc shape.

Therefore, at least a portion of the outer edge of each engaging surface 12b of the core bar 12 according to this embodiment has a cross-sectional arc shape, as viewed from the side, such that both a trajectory drawn by the outer edge of the engaging surface 12b of the core bar 12 from when the core bar 12 starts to enter a tooth groove formed between teeth 22 of the sprocket 20 until engagement between the core bar 12 and the teeth 22 is complete and a trajectory drawn by the outer edge of the engaging surface 12b of the core bar 12 from when the core bar 12 starts to disengage from the teeth 22 until disengagement is complete do not project further outward circumferentially than the engaging surface 12b of the core bar 12 when the engagement is complete. The entire engaging surface 12b of the core bar 12 in this embodiment has a cross-sectional arc shape.

In other words, as illustrated in FIG. 7, the trajectory drawn by the outer edge of the engaging surface 32b of the core bar 32 until engagement of the core bar 32 is complete and the trajectory drawn by the outer edge of the engaging surface 32b of the core bar 32 from when disengagement subsequently starts until the disengagement is complete do not project further outward circumferentially than the engaging surface 32b of the core bar 32 when the engagement is complete, as in the state between the engaging surface 32b indicated by the bold line and the tooth face F indicated by the dashed dotted line in FIG. 7. Therefore, by forming the tooth base surface 52a of the teeth 52 in the sprocket 50 as a recess, as illustrated in FIG. 7, the clearance C between the core bar 12 and the engaging surface 12b need not be formed.

The construction method described with reference to FIG. 3 provides an example of how to prescribe the core bars 12 of this embodiment.

This method for constructing a boundary shape first defines the circumference of the main cord layer 14 as a reference circle and places position (1) before the main cord layer 14 virtually separates from this reference circle as the position at which the elastic crawler 40 is completely wrapped around the sprocket 50. At position (1), an edge surface 42a of the core bar 42 with any cross-sectional arc shape contacts the tooth bottom surface 51a of the sprocket 50 perpendicularly and engages by catching on the tooth face F of the teeth 52 in the sprocket 50, completing the engagement between the core bar 42 and the teeth 52. A point $P_1$ at a desired position is then plotted at a distance $x_1$, in the direction of a tangent to the tooth bottom surface 51a of the sprocket 50, from the central axis $O_1$ of the core bar 42 when engagement between the core bar 42 and the teeth 52 is complete. The point $P_1$ becomes the outer edge that is positioned in one of the circumferential directions (forward and backward directions) of the edge surface 12a of the core bar 12 according to this embodiment, i.e. one of two circumferential outer edges 12e of the edge surface 12a in the core bar 12. In other words, the point $P_1$ is a point for determining the circumferential length of the edge surface 12a of the core bar 12. This circumferential length is set to twice the distance $x_1$.

Next, the point $P_1$ is plotted chronologically for when the main cord layer 14 is virtually separated in the direction of the arrow $d_o$ from the position (1). FIG. 3 illustrates the trajectory of this point $P_1$ as a plot set surrounded by a dashed frame. This trajectory is the trajectory drawn by the circumferential outer edge 42e of the edge surface 42a of the core bar 42 before and after the core bar 42 of the elastic crawler 40 and the teeth 52 of the sprocket 50 engage (from when the core bar 42 starts to enter the tooth groove of the sprocket 50 until engagement between the core bar 42 and the teeth 52 of the sprocket 50 is complete, and from when the core bar 42 starts to disengage from the teeth 52 until disengagement is complete). The edge surface 12a of the core bar 12 according to this embodiment and the tooth base surface 22a of the teeth 22 in the sprocket 20 will catch unless the circumferential length of the core bar 12 according to this embodiment is longer than this trajectory. The plot set surrounded by the dashed frame is thus the limit region where undercutting does not occur.

Next, from within the plot set surrounded by the dashed frame, any point at a distance from the point $P_1$ is designated as point $P_2$. In this embodiment, the difference between point $P_1$ and $P_2$ in the direction of the central axis $O_1$ is the distance from the edge surface 12a of the core bar 12 according to this embodiment in FIG. 2A, i.e. the thickness of the core bar 12. Twice the length from the central axis $O_1$ to the point $P_2$ is the circumferential length of the core bar 12 at that position. The point $P_2$ in this embodiment forms a portion of the circumferential outer edge of the engaging surface 12b of the core bar 12 according to this embodiment. Since the plot set surrounded by the dashed frame is the limit region where undercutting does not occur, no undercutting occurs at the position of the point $P_2$.

As before, the point $P_2$ is then plotted chronologically for when the main cord layer 14 is virtually separated in the direction of the arrow $d_o$ from the position (1). FIG. 3 illustrates the trajectory of this point $P_2$ as a plot set surrounded by a dashed dotted frame. The plot set surrounded by the dashed dotted frame is the limit region where undercutting does not occur.

Next, from within the plot set surrounded by the dashed dotted frame, any point at a distance from the point $P_2$ is designated as point $P_3$. In this embodiment, the difference between point $P_1$ and $P_3$ in the direction of the central axis $O_1$ is the distance from the edge surface 12a of the core bar 12 according to this embodiment in FIG. 2A, i.e. the thickness of the core bar 12. Twice the length from the central axis $O_1$ to the point $P_3$ is the circumferential length of the core bar 12 at that position. In other words, the point $P_3$ in this embodiment forms a portion of the circumferential outer edge of the engaging surface 12b of the core bar 12 according to this embodiment. Since the plot set surrounded by the dashed dotted frame is the limit region where undercutting does not occur, no undercutting occurs at the position of the point $P_3$.

As before, the point $P_3$ is then plotted chronologically for when the main cord layer 14 is virtually separated in the direction of the arrow $d_o$ from the position (1). FIG. 3 illustrates the trajectory of this point $P_3$ as a plot set surrounded by a dashed double-dotted frame. The plot set surrounded by the dashed double-dotted frame is the limit region where undercutting does not occur.

From within the plot set surrounded by the dashed double-dotted frame, any point at a distance from the point $P_3$ is designated as a new point. By repeating the above steps to calculate points $P_1, P_2, P_3, \ldots$, and connecting these points, the outer edge shape of the engaging surface 12b of the core bar 12 according to this embodiment as illustrated in FIG. 2A can be constructed.

FIG. 4 sequentially illustrates the core bar 12, formed with the above construction method, from complete engagement between the core bar 12 and the teeth 22 of the sprocket 20 through subsequent disengagement. As is clear from the trajectory drawn by the outer edge of the engaging surfaces 12b of the core bar 12, the outer edges of the engaging surfaces 12b of the core bar 12 before and after engagement between the core bar 12 and the teeth 22 of the sprocket 20 is complete, indicated by the dashed dotted outlines, exhibit almost no change from the outer edges of the engaging surfaces 12b of the core bar 12 when engagement is complete, indicated by the bold outline. Undercutting thus does not occur upon adopting the core bar 12 according to this embodiment. Consequently, the shape of the tooth base surface 22a of the sprocket 20 can take the same dimensions as the outer edge shape of the engaging surface 12b of the core bar 12. The shape of the tooth faces $F_2$ of the teeth 22 of the sprocket 20, for example the shape of the tooth base surface 22a of the teeth 22 in the sprocket 20 as in this embodiment, may be matched to the outer edge shape of the engaging surface 12b of the core bar 12. In other words, the shape of the teeth 22 in the sprocket 20 may be a shape corresponding to the outer edge shape of the engaging surface 12b of the core bar 12 in the elastic crawler 10.

The cross-sectional arc shape of the engaging surface 12b of the core bar 12 can also be approximated by calculating two points $C_1$, $C_2$ that satisfy the following two conditions (i), (ii), where PCD is the pitch circle diameter of the elastic crawler 10 when the elastic crawler 10 is wrapped around the sprocket 20.

As an example with reference to FIG. 2A, the cross-sectional arc shape has one of two points $C_1$, $C_2$ as a center point on the opposite side of the center line $O_1$ of the core bar 12, where the points $C_1$, $C_2$ (i) are positioned at a distance of PCD×a on the sprocket 20 side of a bending center line $O_3$ when the elastic crawler 10 is wrapped around, where 0.25%≤a≤3%, and (ii) are positioned a distance of PCD×b apart in the forward and backward directions of the core bar 12, where 2.5%≤b≤3%.

In the core bar 12 in FIG. 2A, y=PCD×m from condition (i), where the value of m is in the range 0.25%≤m≤3%, and Δx=PCD×n from condition (ii), where the value of n is in the range of 2.5%≤n≤3%. In the core bar 12 in FIG. 2A, the bending center line $O_3$ when the elastic crawler 10 is wrapped around is positioned on the pitch circle diameter PCD, i.e. on the main cord layer 14 in this embodiment. Letting PCD=200 mm, m=0.25%, and n=2.5%, the engaging surfaces 12b of the core bar 12 have cross-sectional arc shapes with a radius of curvature $r_b$=20 mm and respective center points $C_1$, $C_2$ on the opposite side of the center line $O_1$ of the core bar 12, where the points $C_1$, $C_2$ satisfy (i) y=0.5 mm and (ii) Δx=5 mm.

In this embodiment, the engaging surfaces 12b of the core bar 12 each include a corner surface $12b_1$ extending in the width direction. The corner surface $12b_1$ is a curved surface such that the cross-sectional outline as viewed from the side protrudes outward from the core bar 12 (in this embodiment, away from the central axis $O_1$ of the core bar 12). In this embodiment, the two corner surfaces $12b_1$ are each formed as a curved surface with a radius of curvature $r_d$. The radius of curvature $r_d$ may be within a range of 3 mm to 10 mm (3 mm≤$r_d$≤10 mm) with respect to the central axis $O_1$ of the core bar 12. An example of a specific radius of curvature $r_d$ is 5 mm.

In FIGS. 1A and 4, the rotation direction when the sprocket 20 rotates counterclockwise is a forward rotation direction D. In the drawings, between the two teeth 22 of the sprocket 20, the tooth 22 to the left in the drawings is designated the left tooth (the tooth in the forward rotation direction), and the tooth 22 to the right in the drawings is designated the right tooth (the tooth in the backward rotation direction). Furthermore, between the tooth faces $F_2$ of each tooth 22, the tooth face $F_2$ to the left in the drawings is designated the tooth face $F_2$ in the forward rotation direction, and the tooth face $F_2$ to the right in the drawings is designated the tooth face $F_2$ in the backward rotation direction. Next, between the engaging surfaces 12b of the core bar 12, the engaging surface 12b to the left in the drawings is designated as the left engaging surface 12b, and the engaging surface 12b to the right in the drawings is designated as the right engaging surface 12b.

In the embodiment in FIG. 1A, for example when the elastic crawler 10 is wrapped around the sprocket 20, teeth 22 of the sprocket 20 are housed in the housings 13 formed in the endless belt 11 of the elastic crawler 10, whereas core bars 12 of the elastic crawler 10 are each housed in the tooth groove formed between two teeth 22, as illustrated in FIG. 1A. In this embodiment, when the sprocket 20 is rotated in the forward rotation direction D to drive the elastic crawler 10, mainly the engaging tooth face $F_2$ in the forward rotation direction of the right tooth 22 in the sprocket 20 engages with the right engaging surface 12b of the core bar 12.

With reference to FIG. 4, the operation of an elastic crawler drive mechanism 100 according to this embodiment is described in further detail.

Upon the sprocket 20 rotating in the forward rotation direction D, the elastic crawler 10 is wrapped around the sprocket 20, causing the core bar 12 to enter into the tooth groove formed between two teeth 22 of the sprocket 20 perpendicularly along the arrow $d_1$ while drawing an involute curve from the left in the drawing.

As described above, at least a portion of the outer edge of the engaging surface 12b of the core bar 12 in this embodiment has a cross-sectional arc shape such that the trajectory drawn by the outer edge of the engaging surface 12b of the core bar 12 from when the core bar 12 of the elastic crawler 10 starts to enter the tooth groove of the sprocket 20 until engagement between the core bar 12 and the teeth 22 of the sprocket 20 is complete does not project further outward than the outer edge 12b of the core bar 12 when the engagement is complete. Therefore, upon the left engaging surface 12b of the core bar 12 contacting the tooth face $F_2$ in the backward rotation direction of the left tooth 22 of the sprocket 20 (in this embodiment, the tooth base surface 22a), the core bar 12 moves so as to roll the tooth base surface 22a of the left tooth 22 of the sprocket 20 in the direction indicated by the arrow $d_2$. As a result, the edge surface 12a of the core bar 12 contacts the tooth bottom surface 21a of the sprocket 20 so as to be parallel to the tooth bottom surface 21a of the sprocket 20.

In this way, by the edge surface 12a of the core bar 12 contacting the tooth bottom surface 21a of the sprocket 20, the elastic crawler 10 is wrapped around the sprocket 20. Upon the sprocket 20 further rotating in the forward rotation direction D, the tooth base surface 22a in the forward rotation direction of the right tooth 22 in the sprocket 20 catches on the right engaging surface 12b of the core bar 12, engaging the core bar 12 of the elastic crawler 10 with the tooth base surface 22a of the right tooth 22 in the sprocket 20. Consequently, rotation of the sprocket 20 can be transmitted to the elastic crawler 10. In other words, the sprocket 20 can transmit a driving force to the elastic crawler 10.

The outer edge shape of the engaging surface 12b of the core bar 12 in this embodiment is a cross-sectional arc shape that does not produce undercutting. As indicated by the arrow $d_1$ in FIG. 4, the engaging surfaces 12b of the core bar 12 align with the tooth base surfaces 22a of the sprocket 20 directly, or by rolling contact, from when the core bar 12 of the elastic crawler 10 starts to enter the tooth groove of the sprocket 20 until engagement between the core bar 12 and the teeth 22 of the sprocket 20 is complete. Consequently, the area for transmitting the driving force is expanded while dispersing surface pressure, without producing undercutting.

Also, in this embodiment, from when the core bar 12 starts to disengage from the teeth 22 of the sprocket 20 until the disengagement is complete, the engaging surfaces 12b of the core bar 12 follow a trajectory with line symmetry about the central axis $O_1$ of the core bar relative to the arrow $d_1$, as indicated by the arrow $d_3$ in FIG. 4. The engaging surfaces 12b therefore separate from the tooth base surfaces 22a of the sprocket 20 directly, or by rolling contact in the direction indicated by the arrow $d_4$. Consequently, the core bar 12 and the teeth 22 of the sprocket 20 disengage without producing undercutting.

The shapes of the core bars 12 and the teeth 22 of the sprocket 20 in this embodiment are respectively symmetrical about the central axes $O_1$, $O_2$. Hence, when driving the elastic crawler 10 backward by rotating the sprocket 20 in reverse, in the opposite direction from the arrow D, the same effects as when driving the elastic crawler 10 forward in the direction of the arrow D can be obtained.

As described above, the outer edge of the engaging surface 12b of the core bar 12 in the elastic crawler 10 according to this embodiment has a cross-sectional arc shape that does not produce undercutting. Consequently, the undercutting occurring before and after engagement between the engaging surface 12b of the core bar 12 of the elastic crawler 10 and the teeth 22 of the sprocket 20 can be prevented, eliminating concerns over wear. The engaging surfaces 12b of the core bar 12 are nearly in surface contact with the tooth base surfaces 22a of the sprocket 20, without inclusion of a clearance C. The area for transmitting the driving force can therefore be expanded, and the surface pressure can be lowered. The elastic crawler 10 according to this embodiment thus improves the durability of the elastic crawler 10 and the sprocket 20.

As described with reference to FIG. 2A and other figures, the cross-sectional arc shape of the engaging surfaces 12b of the core bar 12 can be approximated by arc shapes having center points, such as the points $C_1$ and $C_2$, positioned at a distance of PCD×m on the sprocket 20 side of the bending center line $O_3$ when the elastic crawler 10 is wrapped around the sprocket 20, where 0.25%≤m≤3%, and PCD is the pitch circle diameter of the elastic crawler 10 when the elastic crawler 10 is wrapped around the sprocket 20.

The points approximating the center points of a cross-sectional arc shape that does not produce undercutting can be calculated easily in this case, facilitating manufacturing of the core bar 12 and hence of the elastic crawler 10.

As described above, the points approximating the center points may approximate the two points $C_1$, $C_2$ positioned a distance PCD×n apart in the circumferential direction of the endless belt 11, where 2.5%≤n≤5%.

An arc shape that does not produce undercutting and is suitable for forward and reverse can easily be prescribed in this case, facilitating manufacturing of the core bar 12 and hence of the elastic crawler 10.

The elastic crawler drive mechanism 100 according to this embodiment includes the elastic crawler 10, which has core bars 12, and the sprocket 20. The elastic crawler drive mechanism 100 according to this disclosure can therefore improve the durability of the elastic crawler 10 and the sprocket 20.

The tooth base surfaces 22a of the teeth 22 of the sprocket 20 in the elastic crawler drive mechanism 100 according to this embodiment correspond to the outer edge shape of the engaging surfaces 12b of the core bars 12.

The contact area in this case when the core bar 12 of the elastic crawler 10 engages with the teeth 22 of the sprocket 20 increases, thereby decreasing the load on the teeth 22 of the sprocket 20 and on the engaging surfaces 12b of the core bar 12 through a decrease in stress. Consequently, the durability of the elastic crawler 10 and the sprocket 20 is further improved.

Figure 2B:
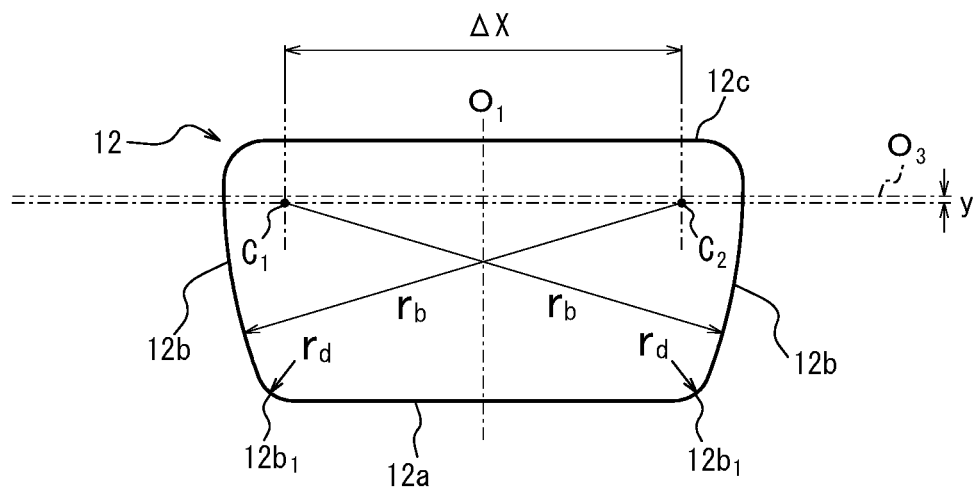
FIG. 2B is a side view schematically illustrating a core bar according to another one of the disclosed embodiments.

FIG. 2B illustrates another embodiment of the core bar 12. In FIG. 2B, the bending center line $O_3$ when the elastic crawler 10 is wrapped around is positioned on the pitch circle diameter PCD. Letting PCD=600 mm, m=3%, and n=5%, the engaging surfaces 12b of the core bar 12 have cross-sectional arc shapes with a radius of curvature $r_b$=35 mm and respective center points $C_1$, $C_2$ on the opposite side of the center line $O_1$ of the core bar 12, where the points $C_1$, $C_2$ satisfy (i) y=18 mm and (ii) Δx=30 mm.

This disclosure may also be applied to an elastic crawler that does not use core bars, i.e. a coreless elastic crawler.

Figure 5A:
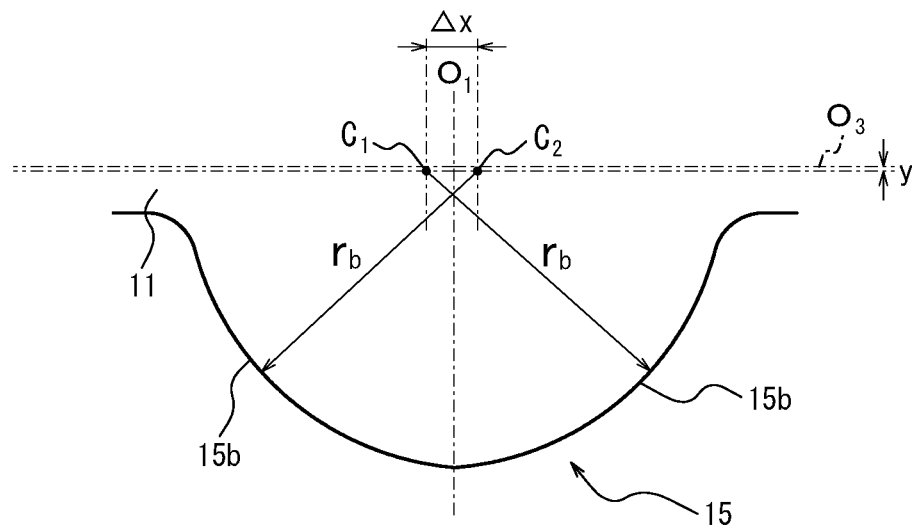
FIG. 5A is a side view schematically illustrating a projection according to one of the disclosed embodiments.

FIG. 5A illustrates a modification in which a plurality of projections (another embodiment of the engaging portion) 15 are disposed on the endless belt 11 of the elastic crawler 10 instead of the core bars 12. The projections 15 are elastic (rubber) projections formed integrally with the endless belt 11. In FIG. 5A, the bending center line $O_3$ when the elastic crawler 10 is wrapped around is positioned on the pitch circle diameter PCD. Letting PCD=200 mm, m=0.25%, and n=2.5%, engaging surfaces 15b of the projection 15 have cross-sectional arc shapes with a radius of curvature $r_b$=30 mm and respective center points $C_1$, $C_2$ on the opposite side of the center line $O_1$ of the projection 15, where the points $C_1$, $C_2$ satisfy (i) y=0.5 mm and (ii) Δx=5 mm.

Figure 5B:
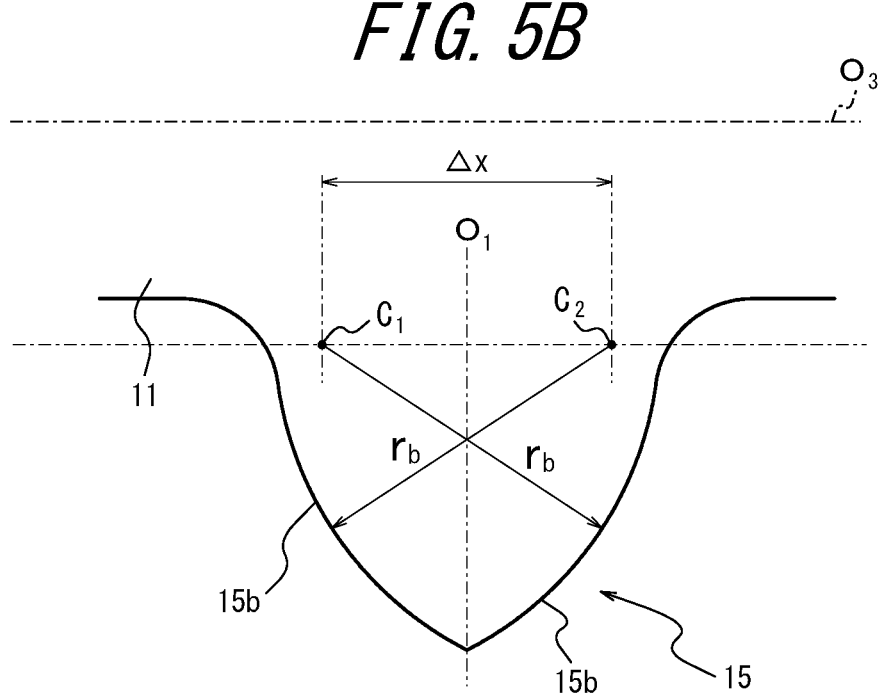
FIG. 5B is a side view schematically illustrating a projection according to another one of the disclosed embodiments.

FIG. 5B also illustrates a modification in which projections 15 are disposed on the endless belt 11 of the elastic crawler 10 instead of the core bars 12. In FIG. 5B, the bending center line $O_3$ when the elastic crawler 10 is wrapped around is positioned on the pitch circle diameter PCD. Letting PCD=600 mm, m=3%, and n=5%, engaging surfaces 15b of the projection 15 have cross-sectional arc shapes with a radius of curvature $r_b$=35 mm and respective center points $C_1$, $C_2$ on the opposite side of the center line $O_1$ of the projection 15, where the points $C_1$, $C_2$ satisfy (i) y=18 mm and (ii) Δx=30 mm.

Figure 6A:
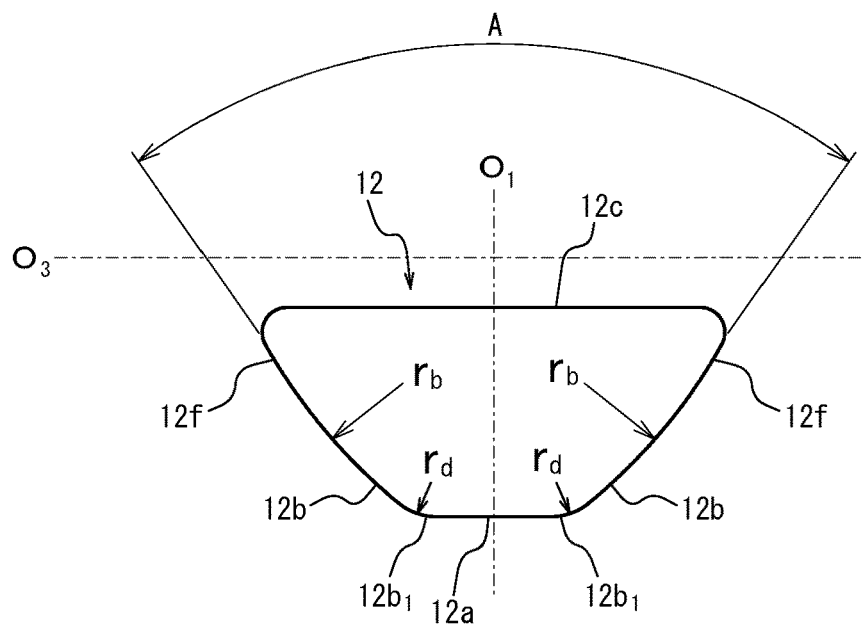
FIG. 6A is a side view schematically illustrating a core bar according to yet another of the disclosed embodiments.
Figure 6B:
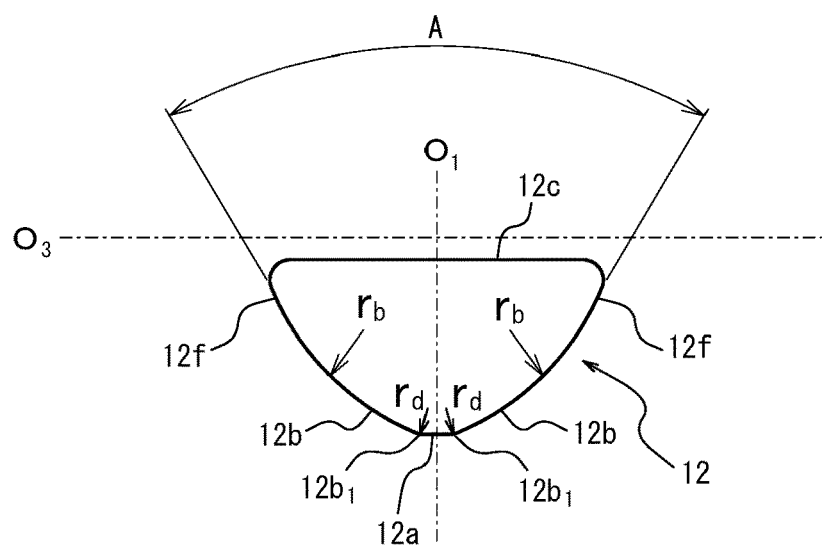
FIG. 6B is a side view schematically illustrating a core bar according to still another of the disclosed embodiments.

FIGS. 6A and 6B are respectively modifications to FIGS. 2A and 2B, in which a portion of the arc on the bending center axis $O_3$ of the engaging surfaces 12b of the core bar 12 is a flat face 12f with a linear cross-section. This flat face 12f can also function as the engaging surface of the core bar 12. In this embodiment, each flat face 12f (second engaging surface 12f) is inclined relative to the center line $O_1$ of the core bar 12 so as to approach the center line $O_1$ of the core bar 12 with increased proximity to the edge surface 12a. The angle between the two engaging surfaces 12b (core bar facing angle) A is, for example, 70° in FIG. 6A and 60° in FIG. 6B.

In this disclosure, the core bar 12 in FIG. 2B fulfills the same functions as the core bar 12 in FIG. 2A, as do the projections 15 constituted by an elastic material, such as rubber, in FIGS. 5A and 5B and the core bars 12 in FIGS. 6A and 6B, which are modifications to FIGS. 2A and 2B.

While embodiments of this disclosure have been described, a variety of changes may be made within the scope of the patent claims. For example, when the sprocket 20 rotates in only one direction, the above-described shape of the tooth faces $F_2$ of the sprocket 20 may be adopted for only one of the two tooth faces $F_2$ that form each tooth 22. Also, the main cord layer 14 is embedded in the endless belt 11 of the elastic crawler 10 in this embodiment, but the main cord layer 14 may be omitted. The various configurations and arrangements adopted in the above embodiments may be combined or exchanged as necessary.

INDUSTRIAL APPLICABILITY

This disclosure may be applied to an elastic crawler that includes a plurality of engaging portions on an elastic endless belt, the engaging portions being capable of engaging with teeth of a sprocket, and to an elastic crawler drive mechanism.

REFERENCE SIGNS LIST

10 Elastic crawler
11 Endless belt
12 Core bar (engaging portion)
12a Edge surface
12b Engaging surface
$12b_1$ Corner surface
13 Housing
14 Main cord layer
15 Projection (engaging portion)
20 Sprocket
21 Disk
21a Tooth bottom surface 22 Tooth
22a Tooth base surface
22b Tooth end surface
22c Tooth tip surface
100 Elastic crawler drive mechanism
$C_1$ Center point
$C_2$ Center point
$R_a$ Radius of curvature of tooth base surface
$R_b$ Radius of curvature of tooth end surface
$R_c$ Radius of curvature of tooth tip surface
$r_b$ Radius of curvature of engaging surface
$r_d$ Radius of curvature of corner surface
A Core bar facing angle
F Tooth face
$F_2$ Engaging tooth face
$O_1$ Center line of core bar (projection)
$O_2$ Center line of tooth

The invention claimed is:

1. An elastic crawler comprising a plurality of engaging portions on an elastic endless belt, the engaging portions being capable of engaging with teeth of a sprocket, wherein
at least a portion of an outer edge of each engaging portion has a cross-sectional arc shape such that both a trajectory drawn by the outer edge of the engaging portion from when the engaging portion starts to enter a tooth groove of the sprocket until engagement between the engaging portion and the teeth is complete, and a trajectory drawn by the outer edge of the engaging portion from when the engaging portion starts to disengage from the teeth until disengagement is complete do not project further outward than the outer edge of the engaging portion when the engagement is complete,
wherein each engaging portion has a central axis, and
wherein each cross-sectional arc shape and a center point of each cross-sectional arc shape are positioned on opposite sides of a corresponding central axis.

2. The elastic crawler of claim 1, wherein the center point is positioned at a distance of PCD×m on the sprocket side of a bending center line when the elastic crawler is wrapped around the sprocket, where 0.25%≤m≤3%, and PCD is a pitch circle diameter of the elastic crawler when the elastic crawler is wrapped around the sprocket.

3. The elastic crawler of claim 2, wherein the center point comprises two points positioned a distance of PCD×n apart in a circumferential direction of the endless belt, where 2.5%≤n≤5%.

4. An elastic crawler drive mechanism comprising the elastic crawler of claim 3 and the sprocket.

5. The elastic crawler drive mechanism of claim 4, wherein an outer edge of the teeth has a shape corresponding to the outer edge of the engaging portions.

6. An elastic crawler drive mechanism comprising the elastic crawler of claim 2 and the sprocket.

7. The elastic crawler drive mechanism of claim 6, wherein an outer edge of the teeth has a shape corresponding to the outer edge of the engaging portions.

8. The elastic crawler of claim 1, wherein the center point comprises two points positioned a distance of PCD×n apart in a circumferential direction of the endless belt, where 2.5%≤n≤5%.

9. An elastic crawler drive mechanism comprising the elastic crawler of claim 8 and the sprocket.

10. The elastic crawler drive mechanism of claim 9, wherein an outer edge of the teeth has a shape corresponding to the outer edge of the engaging portions.

11. An elastic crawler drive mechanism comprising the elastic crawler of claim 1 and the sprocket.

12. The elastic crawler drive mechanism of claim 11, wherein an outer edge of the teeth has a shape corresponding to the outer edge of the engaging portions.

* * * * *